United States Patent
Anzai

(10) Patent No.: US 7,397,919 B2
(45) Date of Patent: Jul. 8, 2008

(54) ACCESS CONTROL METHOD AND STORAGE APPARATUS

(75) Inventor: Ichiro Anzai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 774 days.

(21) Appl. No.: 10/267,078

(22) Filed: Oct. 8, 2002

(65) Prior Publication Data

US 2003/0142822 A1   Jul. 31, 2003

(30) Foreign Application Priority Data

Jan. 31, 2002   (JP)   ............................. 2002-024236

(51) Int. Cl.
*H04N 7/167* (2006.01)

(52) U.S. Cl. .................. 380/203; 380/201; 705/57; 709/203; 709/224; 707/10

(58) Field of Classification Search ................ 380/201, 380/203, 277, 281–282, 30, 44; 713/182–185, 713/156; 711/163–164; 726/9, 2; 705/50, 705/57; 707/9, 10; 709/203, 224
See application file for complete search history.

(56) References Cited

U.S. PATENT DOCUMENTS

| | | | |
|---|---|---|---|
| 5,440,631 A | 8/1995 | Akiyama et al. | ................ 380/4 |
| 5,737,413 A | 4/1998 | Akiyama et al. | ................ 380/4 |
| 5,757,908 A | 5/1998 | Cooper et al. | ................... 380/4 |
| 5,857,021 A | 1/1999 | Kataoka et al. | ................. 380/4 |
| 5,915,025 A | 6/1999 | Taguchi et al. | |
| 6,351,813 B1* | 2/2002 | Mooney et al. | ............. 713/185 |
| 6,956,950 B2* | 10/2005 | Kausik | ....................... 380/277 |
| 2001/0021926 A1 | 9/2001 | Shneck et al. | ................. 705/54 |
| 2002/0002706 A1 | 1/2002 | Sprunk | ......................... 725/29 |

FOREIGN PATENT DOCUMENTS

| | | |
|---|---|---|
| EP | 0 969 667 A2 | 1/2000 |
| EP | 1 037 131 A2 | 9/2000 |
| EP | 1 050 821 A2 | 11/2000 |
| JP | 3-261987 | 11/1991 |
| JP | 05-298085 | 11/1993 |
| JP | 05-314014 | 11/1993 |
| JP | 06-095871 | 4/1994 |
| JP | 10-283263 | 10/1998 |
| JP | 10-283264 | 10/1998 |
| JP | 11-003284 | 1/1999 |
| JP | 11-065934 | 3/1999 |
| JP | 11-265317 | 9/1999 |
| JP | 2000-38867 | 2/2000 |
| WO | WO 01/61591 A1 | 8/2001 |

* cited by examiner

*Primary Examiner*—Thanhnga Truong
(74) *Attorney, Agent, or Firm*—Greer, Burns & Crain, Ltd.

(57) ABSTRACT

An access control method controls access to a storage medium in a storage apparatus, by obtaining key data valid information which indicates whether or not a key data is valid, and enciphering data to be recorded in the storage medium using the key data only when the key data valid information is turned ON.

4 Claims, 16 Drawing Sheets

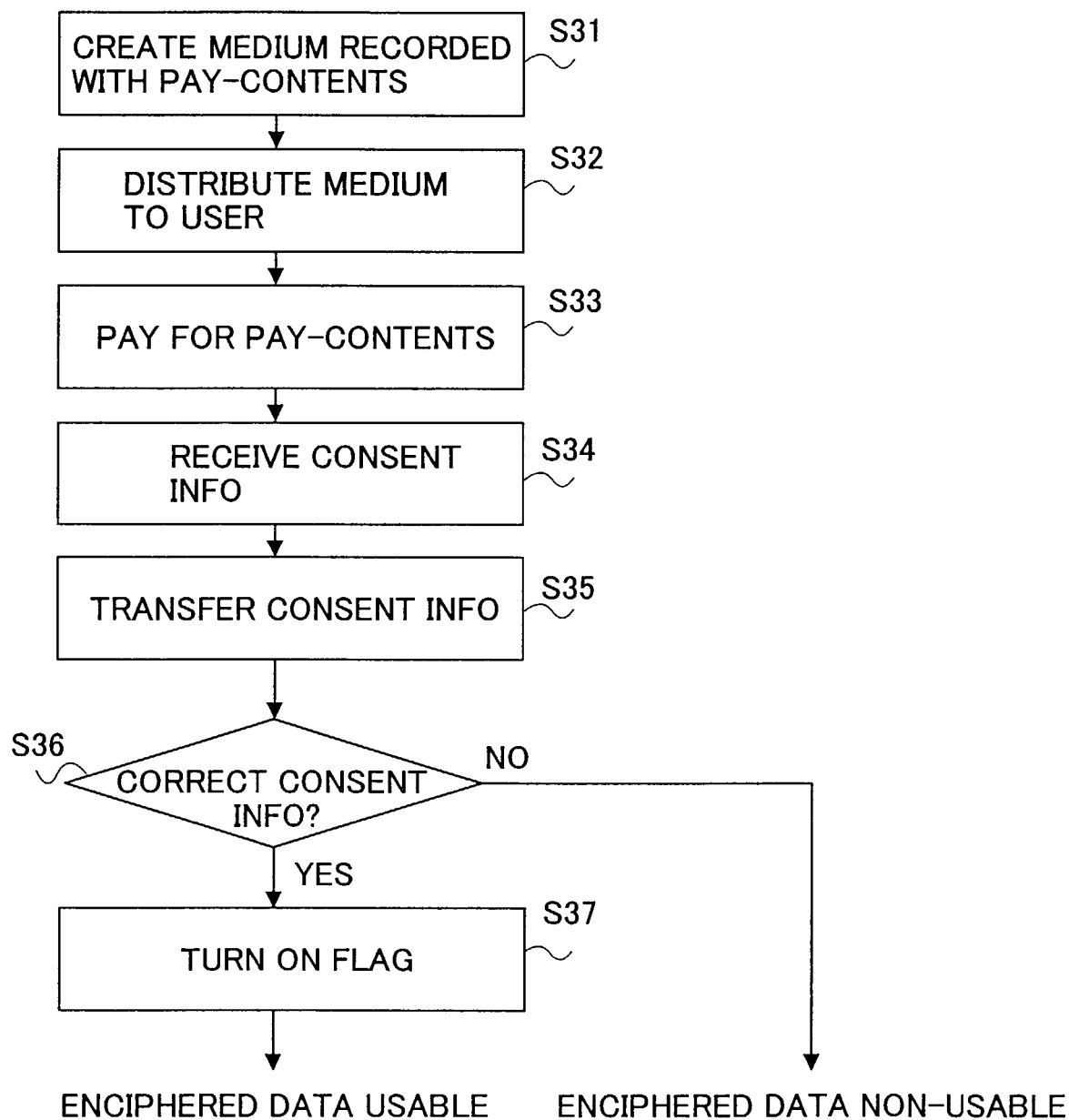

ACCESS CONTROL METHOD AND STORAGE APPARATUS

BACKGROUND OF THE INVENTION

This application claims the benefit of a Japanese Patent Application No. 2002-024236 filed Jan. 31, 2002, in the Japanese Patent Office, the disclosure of which is hereby incorporated by reference.

1. Field of the Invention

The present invention generally relates to access control methods and storage apparatuses, and more particularly to an access control method for controlling access to a storage medium which is recorded with enciphered information and to a storage apparatus which employs such an access control method.

2. Description of the Related Art

In information processing apparatuses such as personal computers, information is recorded in and reproduced from various kinds of storage media. The storage media may roughly be categorized into a fixed type which is fixed within a storage apparatus, and a portable type which is loaded into and unloaded from the storage apparatus. Examples of such storage media include card-shaped or disk-shaped magnetic storage media, optical storage media and magneto-optical storage media, semiconductor memory devices such as RAMs, and the like. The kind of information recorded in and reproduced from such storage media is not limited to a specific kind, and for example, includes document information, image information, audio information, program information or arbitrary combinations of such information.

Conventionally, various methods have been proposed to prevent unauthorized access to the storage medium. For example, there is a proposed method which prohibits access to the storage medium unless the user is confirmed to be a legitimate (or authorized) user by making a password authentication. According to this proposed method, an access to the storage medium cannot be made unless a password input to the personal computer matches a password recorded in the storage medium.

In other words, the information cannot be reproduced from and the information cannot be recorded in the storage medium, unless it is confirmed through password authentication that the user attempting to access this storage medium is the legitimate user. More particularly, if the user is not the legitimate user, a recording and reproducing means for recording information in and reproducing information from the storage medium is controlled to a non-operational state. Accordingly, a third party other than the legitimate user cannot illegally acquire the information recorded in the storage medium. Furthermore, a third party other than the legitimate user cannot illegally record information in the storage medium or erase recorded information from the storage medium.

However, even in the case of the storage medium which requires the password authentication when making access, no measures are taken to prevent reading of the information itself recorded in the storage medium. This is because the access to the storage medium is prohibited by controlling the recording and reproducing means to the non-operational state. For this reason, there is a problem in that, once the storage medium is acquired, a person familiar with physical conditions and the like of the storage medium may read the information recorded in the storage medium using a reading unit or the like with relative ease.

Moreover, there is also another problem in that illegal or unauthorized copies can be created with ease, since the recorded information can be read from the storage medium.

Therefore, with respect to the information recorded in the storage medium, problems related to security or problems related to copyright are generated.

SUMMARY OF THE INVENTION

Accordingly, it is a general object of the present invention to provide a novel and useful access control method and storage apparatus in which the problems described above are eliminated.

Another and more specific object of the present invention is to provide an access control method and a storage medium, which make contents of information read from a storage medium indecipherable even if one is successful in reading the information recorded in the storage medium, so as to secure security for the information recorded in the storage medium and to positively protect copyright.

Still another object of the present invention is to provide an access control method for controlling access to a storage medium in a storage apparatus, comprising the steps of obtaining key data valid information which indicates whether or not a key data is valid; and enciphering data to be recorded in the storage medium using the key data only when the key data valid information is turned ON. According to the access control method of the present invention, it is possible to make the contents of information read from the storage medium indecipherable even if one is successful in reading the information recorded in the storage medium, so as to secure security for the information recorded in the storage medium and to positively protect copyright.

A further object of the present invention is to provide an access control method for controlling access to a storage medium in a storage apparatus, comprising the steps of obtaining key data valid information which indicates whether or not a key data is valid; and deciphering data reproduced from the storage medium using the key data only when the key data valid information is turned ON. According to the access control method of the present invention, it is possible to make the contents of information read from the storage medium indecipherable even if one is successful in reading the information recorded in the storage medium, so as to secure security for the information recorded in the storage medium and to positively protect copyright.

Another object of the present invention is to provide a storage apparatus comprising a recording section recording data in a storage medium; an enciphering circuit; and a control unit, responsive to key data valid information which indicates whether or not a key data is valid, carrying out a control to supply data to be recorded in the storage medium to the recording section after enciphering the data by the enciphering circuit using the key data only when the key data valid information is turned ON, and bypassing the enciphering circuit to supply the data to be recorded in the storage medium to the recording section when the key data valid information is turned OFF. According to the storage apparatus of the present invention, it is possible to make the contents of information read from the storage medium indecipherable even if one is successful in reading the information recorded in the storage medium, so as to secure security for the information recorded in the storage medium and to positively protect copyright.

Still another object of the present invention is to provide a storage apparatus comprising a reproducing section reproducing data from a storage medium; a deciphering circuit;

and a control unit, responsive to key data valid information which indicates whether or not a key data is valid, carrying out a control to supply the data reproduced from the storage medium by the reproducing section to the deciphering circuit to decipher the reproduced data using the key data only when the key data valid information is turned ON, and bypassing the deciphering circuit so as not to decipher the reproduced data when the key data valid information is turned OFF. According to the storage apparatus of the present invention, it is possible to make the contents of information read from the storage medium indecipherable even if one is successful in reading the information recorded in the storage medium, so as to secure security for the information recorded in the storage medium and to positively protect copyright.

A further object of the present invention is to provide a storage apparatus comprising a recording section recording data in a storage medium; an enciphering circuit; and a switching circuit supplying the data to be recorded to the recording section after enciphering the data by the enciphering circuit using a key data or, supplying the data to be recorded to the recording section by bypassing the enciphering circuit, based on key data valid information which indicates whether or not the key data is valid. According to the storage apparatus of the present invention, it is possible to make the contents of information read from the storage medium indecipherable even if one is successful in reading the information recorded in the storage medium, so as to secure security for the information recorded in the storage medium and to positively protect copyright. In addition, it is possible to secure compatibility with the storage media recorded on existing storage apparatuses, so that the security provided by the present invention may be used to suit the user's needs.

Another object of the present invention is to provide a storage apparatus comprising a reproducing section reproducing data from a storage medium; a deciphering circuit; and a switching circuit supplying the data reproduced from the storage medium by the recording section to the deciphering circuit to be deciphered using a key data or, bypassing the deciphering circuit, based on key data valid information which indicates whether or not the key data is valid. According to the storage apparatus of the present invention, it is possible to make the contents of information read from the storage medium indecipherable even if one is successful in reading the information recorded in the storage medium, so as to secure security for the information recorded in the storage medium and to positively protect copyright. In addition, it is possible to secure compatibility with the storage media recorded on existing storage apparatuses, so that the security provided by the present invention may be used to suit the user's needs.

Still another object of the present invention is to provide a business method for providing a storage medium which is recorded with pay-contents enciphered using a key data, comprising the step of turning OFF at an arbitrary timing key data valid information which must be turned ON when deciphering the enciphered pay-contents from the storage medium, so as to enable deciphering of the enciphered pay-contents only for a predetermined time. According to the business method of the present invention, it is possible to make the contents of information read from the storage medium indecipherable even if one is successful in reading the information recorded in the storage medium, so as to secure security for the information recorded in the storage medium and to positively protect copyright.

Other objects and further features of the present invention will be apparent from the following detailed description when read in conjunction with the accompanying drawings.

BRIEF DESCRIPTION OF THE DRAWINGS

FIG. 9 is a flow chart for explaining a process of creating a magneto-optical disk which stores enciphering flags;

DESCRIPTION OF THE PREFERRED EMBODIMENTS

Figure 1:
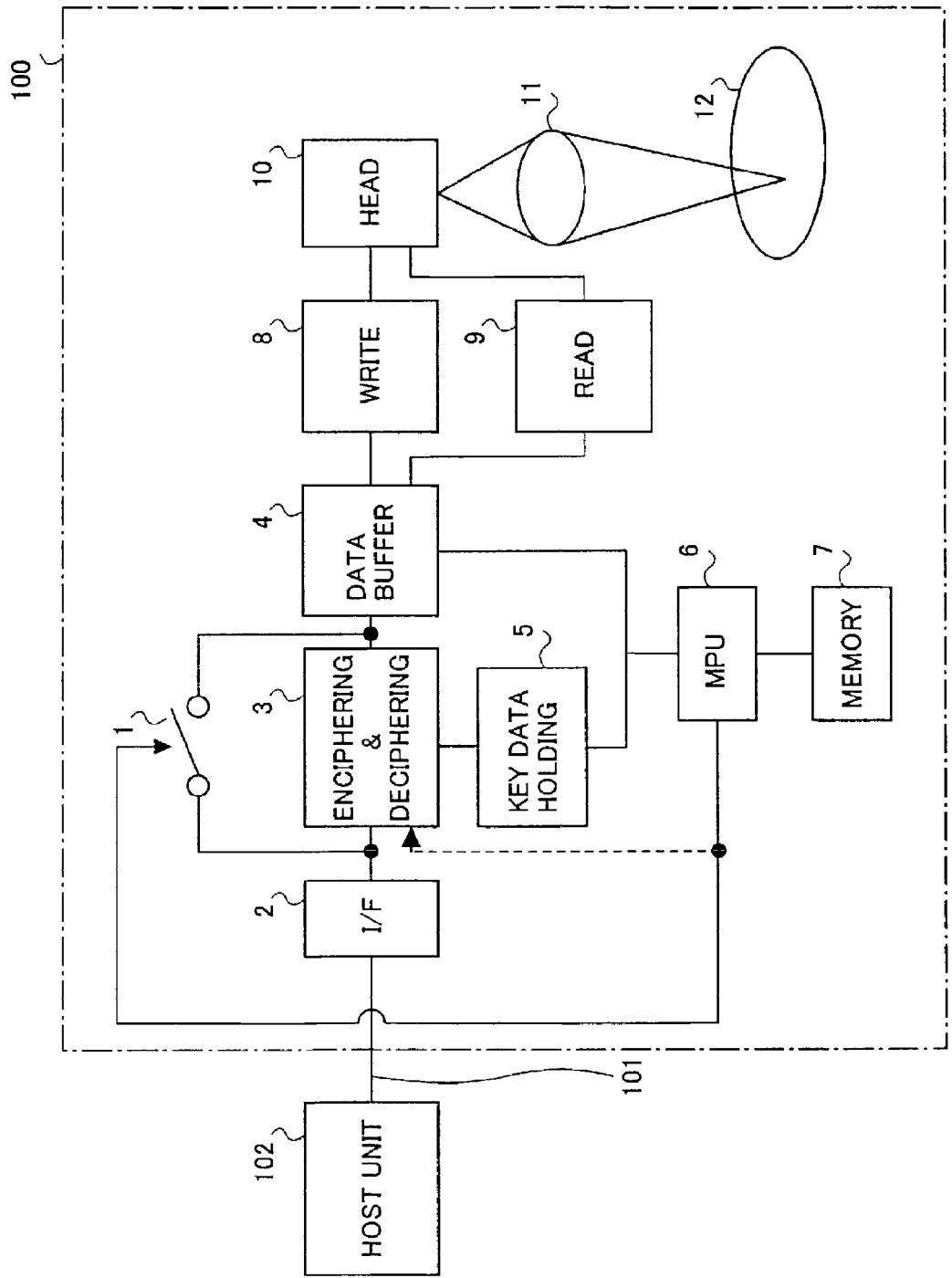
FIG. 1 is a diagram showing a first embodiment of a storage apparatus according to the present invention together with a host unit.

A description will be given of various embodiments of an access control method and a storage apparatus according to the present invention, by referring to the drawings.

FIG. 1 is a diagram showing a first embodiment of the storage apparatus according to the present invention together with a host unit. This first embodiment of the storage apparatus employs a first embodiment of the access control method according to the present invention. In this first embodiment of the storage apparatus, the present invention is applied to a magneto-optical disk apparatus for the sake of convenience.

In FIG. 1, an optical disk apparatus 100 includes a switching circuit 1, a host interface (I/F) 2, an enciphering and deciphering circuit 3, a data buffer 4, a key data holding circuit 5, an MPU 6 which controls various parts of the magneto-optical disk apparatus 100, a memory 7 which stores programs executed by the MPU 6 and data such as intermediate results of operation processes carried out by the MPU 6, a write circuit 8, a read circuit 9, and head 10, and an optical lens system 11. A magneto-optical disk 12 is detachably loaded into the magneto-optical disk apparatus 100. The basic structure of the magneto-optical disk apparatus 100, excluding the switching circuit 1, the enciphering and deciphering circuit 3 and the key data holding circuit 5, are known, and it is of course possible to use other known structures in place thereof. In addition, the magneto-optical disk 12 may be accommodated within a known cartridge (not shown).

The enciphering and deciphering circuit 3 may of course be replaced by an enciphering circuit and a deciphering circuit which are separately provided.

The magneto-optical disk apparatus 100 is connected to a host unit 102 via a cable or wireless connecting means 101. The connecting means may be formed by one or more cable networks, one or more wireless networks, or one or more combinations of such cable and wireless networks. For example, the host unit 102 is formed by an information processing apparatus such as a personal computer. The information processing apparatus forming the host unit 102 may be a desk-top type or a portable type apparatus, and is of course not limited to the personal computer. Accordingly, the information processing apparatus forming the host unit 102 may be a portable terminal equipment such as a portable telephone set, a still and/or motion picture digital camera, an intelligent television apparatus or the like.

Figure 2:
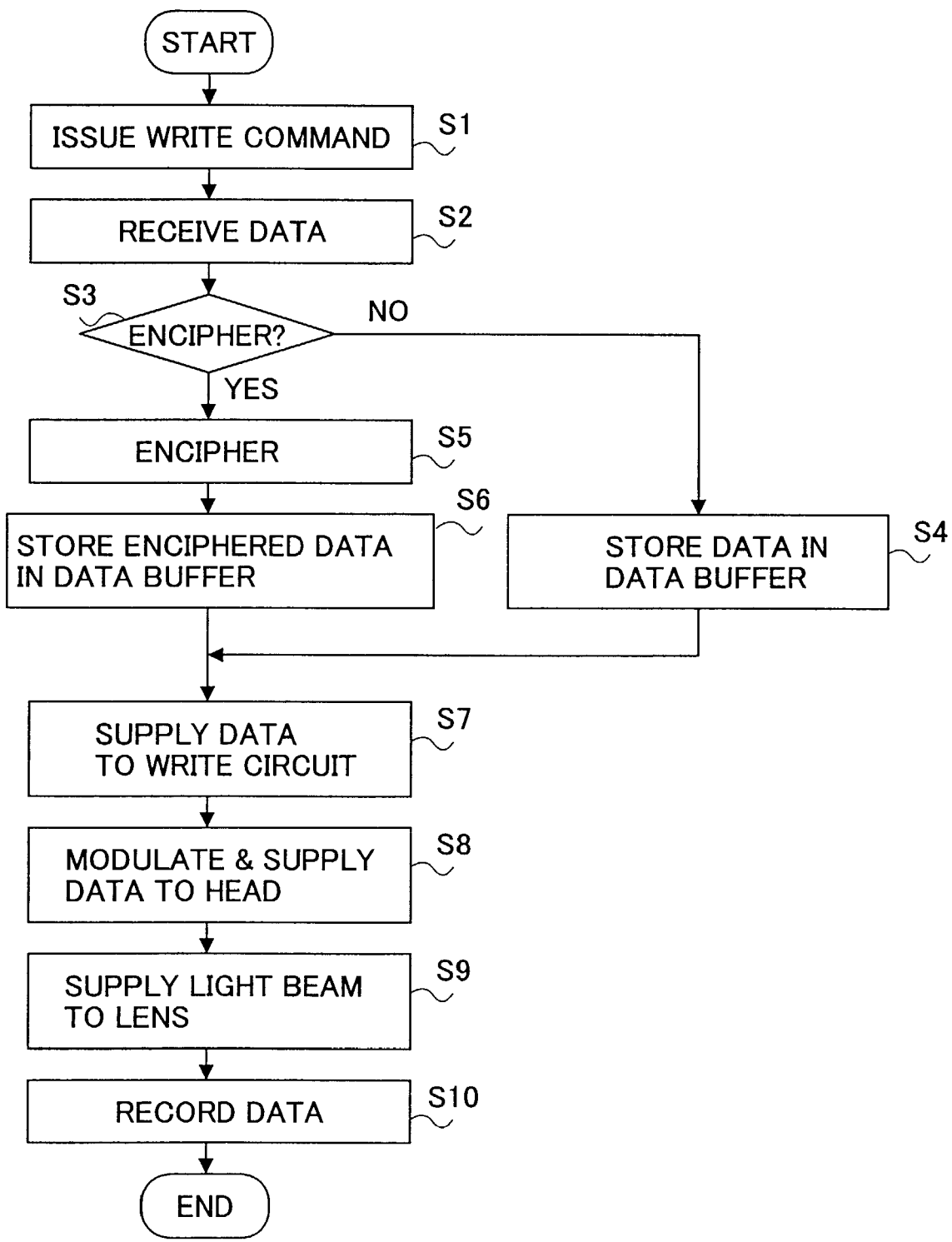
FIG. 2 is a flow chart for explaining the operation during a recording.

First, a description will be given of the operation of the system shown in FIG. 1 during a recording, by referring to FIG. 2. FIG. 2 is a flow chart for explaining the operation during the recording.

In a step S1 shown in FIG. 2, the host unit 102 issues a write command with respect to the magneto-optical disk apparatus 100. In a step S2, the MPU 6 within the magneto-optical disk apparatus 100 receives data issued from the host unit 102 subsequent to the write command, via the interface 2. In a step S3, the MPU 6 decides whether or not the data is to be enciphered. The basis for making this decision in the step S3 will be described later. If the decision result in the step S3 is NO, in a step S4, the MPU 6 closes the switching circuit 1, so as to directly store the data from the host unit 102 received via the interface 2 into the data buffer 4, and the process advances to a step S7 which will be described later.

On the other hand, if the decision result in the step S3 is YES, in a step S5, the MPU 6 opens the switching circuit 1, so as to encipher the data from the host unit 102 received via the interface 2 within the enciphering and deciphering circuit 3 based on key data held by the key data holding circuit 5. In addition, in a step S6, the MPU 6 stores the enciphered data from the enciphering and deciphering circuit 3 into the data buffer 4, and the process advances to the step S7.

In the step S7, the MPU 6 supplies the data stored in the data buffer 4 to the write circuit 8. In a step S8, the MPU 6 controls the write circuit 8 to modulate the data and to supply the modulated data to the head 10. In a step S9, the MPU 6 controls the head 10 to convert the modulated data from the write circuit 8 into a recording light beam which is supplied to the optical lens system 11. In a step S10, the MPU 6 controls the optical lens system 11 so that the recording light beam is converged on the magneto-optical disk 12, so as to record data by the recording light beam irradiated on the magneto-optical disk 12, and the process ends. After the recording of the data ends, the end of the recording may be notified to the host unit 102 by a known method.

Figure 3:
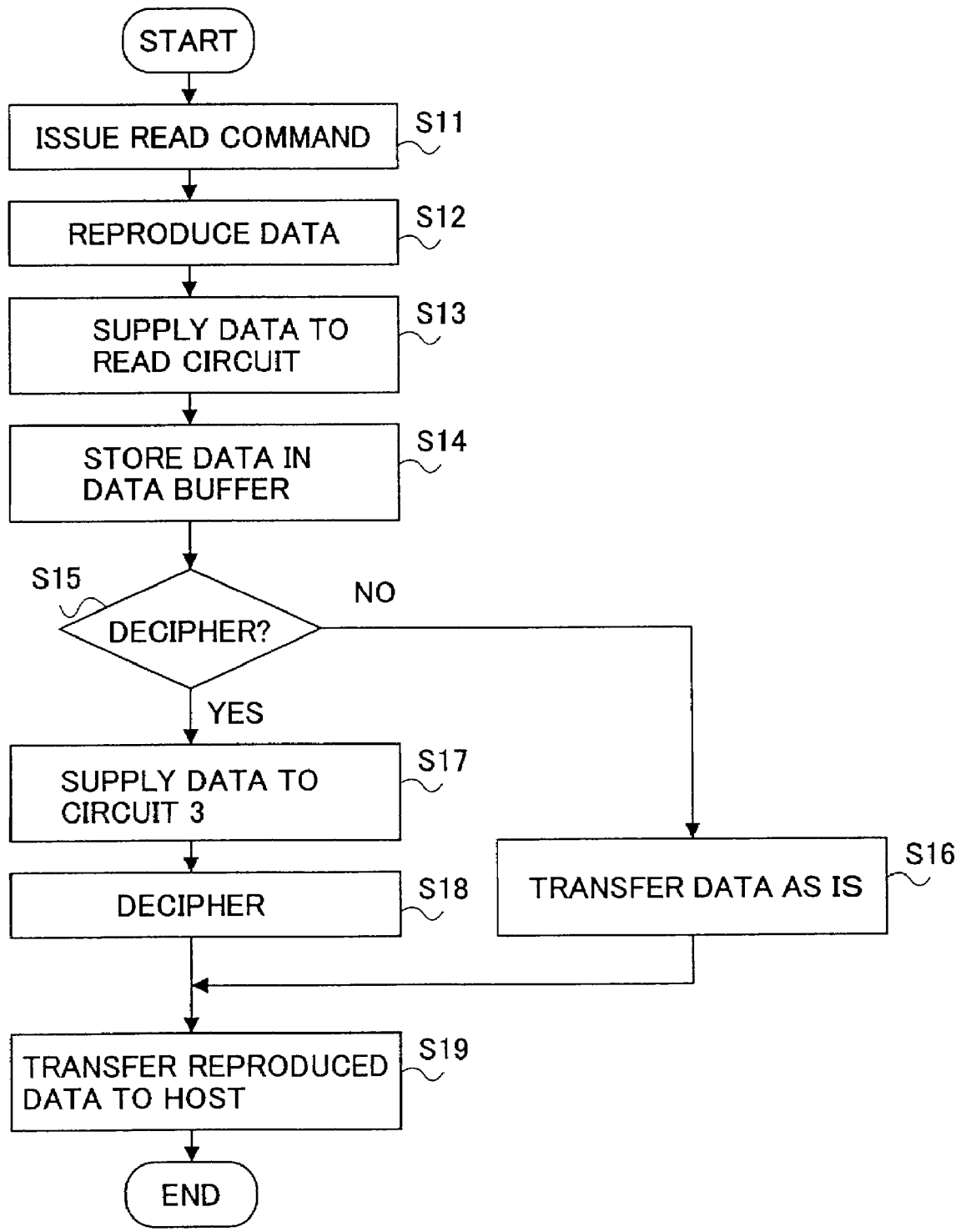
FIG. 3 is a flow chart for explaining the operation during a reproduction.

Next, a description will be given of the operation of the system shown in FIG. 1 during a reproduction, by referring to FIG. 3. FIG. 3 is a flow chart for explaining the operation during the reproduction.

In a step S11 shown in FIG. 3, the host unit 102 issues a read command with respect to the magneto-optical disk apparatus 100. In a step S12, the MPU 6 within the magneto-optical disk apparatus 100 controls the head 10 to emit a reproducing light beam, and controls the optical lens system 11 to converge the reproducing light beam on the magneto-optical disk 12, so as to reproduce data by the reproducing light beam irradiated on the magneto-optical disk 12. In a step S13, the MPU 6 controls the read circuit 9 to read the data reproduced from the magneto-optical disk 12. In a step S14, the MPU 6 stores the read data from the read circuit 9 into the data buffer 4.

In a step S15, the MPU 6 decides whether or not the data is to be deciphered. The basis for making this decision in the step S15 will be described later. For example, enciphering information such as an enciphering flag which indicates that the data is enciphered may be added to the data, and it may be judged that the data is enciphered if the enciphering information is detected. If the decision result in the step S15 is NO, in a step S16, the MPU 6 closes the switching circuit 1, and the process advances to a step S19 which will be described later. On the other hand, if the decision result in the step S15 is YES, in a step S17, the MPU 6 opens the switching circuit 1, so as to supply the data stored in the data buffer 4 to the enciphering and deciphering circuit 3. In addition, in a step S18, the MPU 6 controls the enciphering and deciphering circuit 3 to decipher the data from the data buffer 4 based on the key data held in the key data holding circuit 5, and the process advances to the step S19. In the step S19, the data is transferred to the host unit 102 via the interface 2. The data transferred in the step S19 is the data read from the data buffer 4 in the case where the step S16 is carried out, and is the deciphered data from the enciphering and deciphering circuit 4 in the case where the step S18 is carried out. After the reproduction of the data ends, the end of the reproduction may be notified to the host unit 102 by a known method.

In this embodiment, the data is passed through the enciphering and deciphering circuit 3 or is bypassed the enciphering and deciphering circuit 3, by controlling the switching circuit 1. However, an enable/disable signal which controls the enciphering and deciphering circuit 3 to an operational/non-operational state may be supplied directly from the MPU 6 to the enciphering and deciphering circuit 3 as indicated by a dotted line in FIG. 1. In this case, the data is enciphered or deciphered when the enable signal is supplied to the enciphering and deciphering circuit 3, and the data bypasses the enciphering and deciphering circuit 3 and is not enciphered or deciphered when the disable signal is supplied to the enciphering and deciphering circuit 3. Hence, the switching circuit 1 may be omitted in this case.

Figure 4:
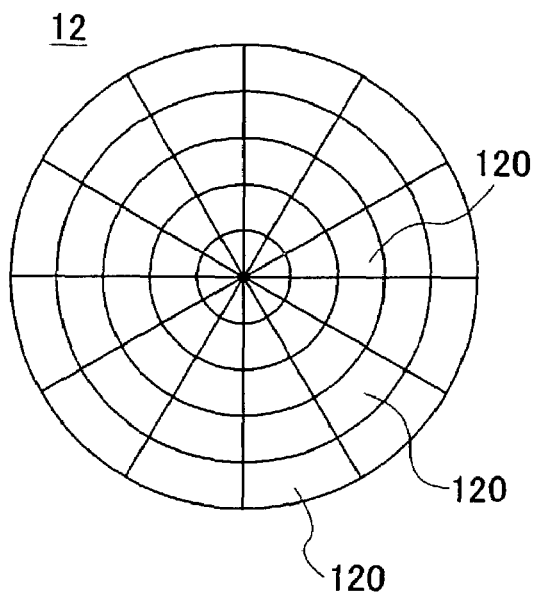
FIG. 4 is a diagram showing a sector structure on a magneto-optical disk.
Figure 5:
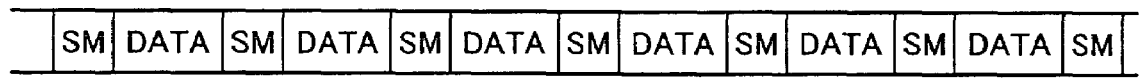
FIG. 5 is a diagram showing a recording format on the magneto-optical disk.

FIG. 4 is a diagram showing a sector structure on the magneto-optical disk 12, and FIG. 5 is a diagram showing a recording format on the magneto-optical disk 12. As shown in FIG. 4, concentric tracks or a spiral track formed on the magneto-optical disk 12 are sectioned radially into a plurality of sectors 120, as is well known. The data is recorded in units of sectors, and as is well known, a sector identifying part SM identifying each sector and a data part DATA are successively recorded on an arbitrary track on the magneto-optical disk 12 as shown in FIG. 5. Accordingly, whether or not to encipher the data to be recorded, and whether or not to decipher the data which is reproduced, may be controlled in units of sectors.

The judgement to determine whether or not to encipher the data to be recorded may be made by issuing an enciphering set command or a no-enciphering set command from the host unit 102, and deciding whether or not the enciphering set command is issued in the step S3 shown in FIG. 2.

Figure 6:
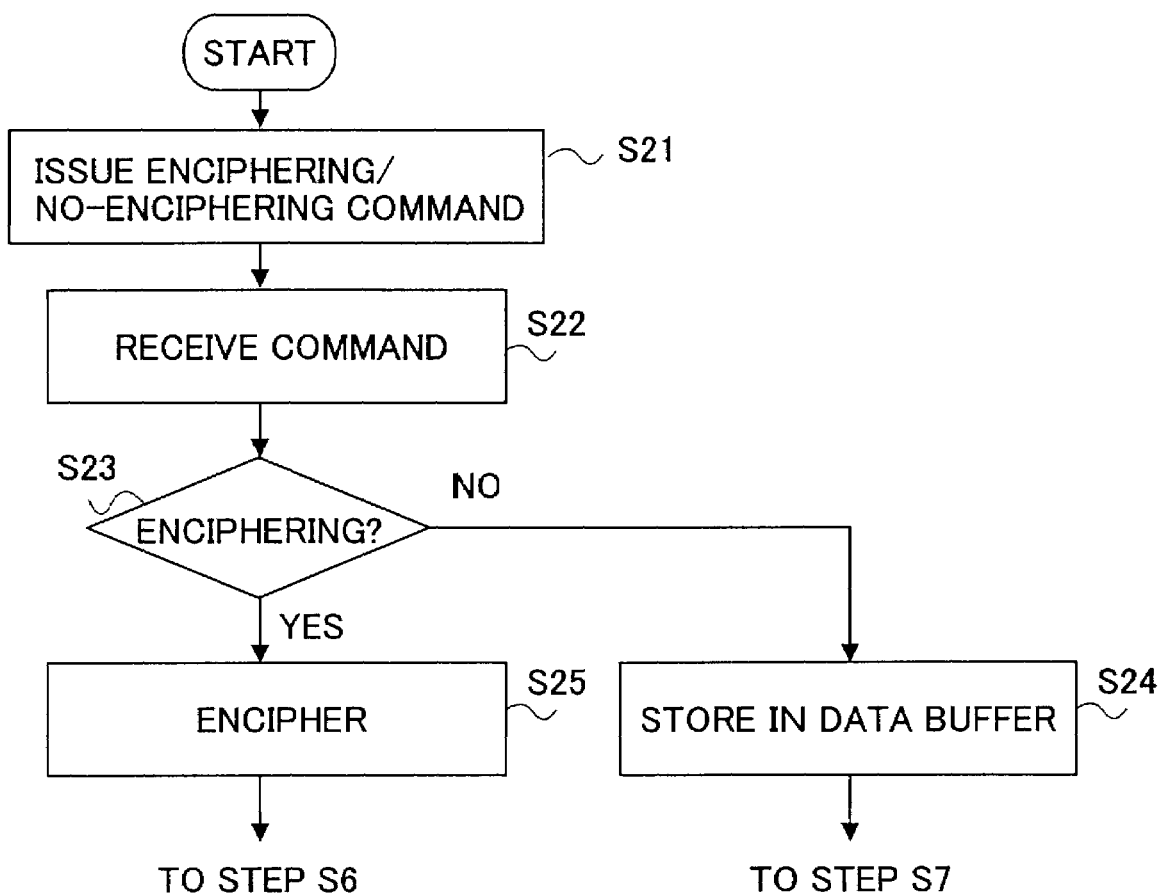
FIG. 6 is a flow chart for explaining the operation during the recording when judging whether or not a data enciphering is to be made based on an enciphering set command.

FIG. 6 is a flow chart for explaining the operation during the recording when judging whether or not the data enciphering is to be made based on the enciphering set command.

In a step S21 shown in FIG. 6, the host unit 102 issues a write command and an enciphering set command with respect to the magneto-optical disk apparatus 100. The enciphering set command may be provided within the write command. In a step S22, the MPU 6 within the magneto-optical disk apparatus 100 receives the data issued from the host unit 10 subsequent to the write command and the enciphering set command, via the interface 2. In a step S23, the MPU 6 decides whether or not to encipher the data, based on the enciphering set command. The decision result in the step S23 is YES if the enciphering set command is received. When using the no-enciphering set command, a judgement opposite to that of the step S23 may be made, and in this case, the YES/NO in FIG. 6 is reversed.

If the decision result in the step S23 is NO, in a step S24, the MPU 6 closes the switching circuit 1 or, controls the enciphering and deciphering circuit 3 to the disabled state, so as to bypass the enciphering and deciphering circuit 3, and store the data received from the host unit 102 via the interface 2 directly into the data buffer 4. The process advances to the step S7 shown in FIG. 2 after the step S24. On the other hand, if the decision result in the step S23 is YES, in a step S25, the MPU 6 opens the switching circuit 1 or, controls the enciphering and deciphering circuit 3 to the enabled state, so as to encipher the data received from the host unit 102 via the interface 2 by the enciphering and deciphering circuit 3 based on the key data held in the key data holding circuit 5. The process advances to the step S6 shown in FIG. 2 after the step S25.

Figure 7:
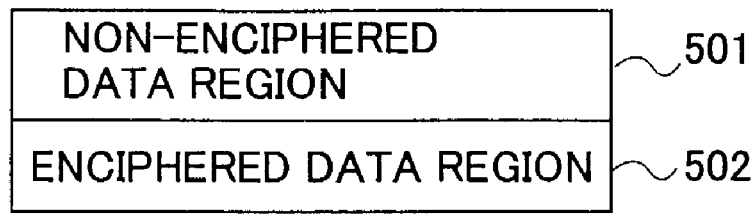
FIG. 7 is a diagram showing a data region on the magneto-optical disk.

Accordingly, in the case of the write command which is not accompanied by an enciphering set command or, the write command which is accompanied by a no-enciphering set command, the data which is not enciphered, that is, the non-enciphered data, is recorded in a non-enciphered data region 501 on the magneto-optical disk 12 as shown in FIG. 7. FIG. 7 is a diagram showing a data region on the magneto-optical disk 12. On the other hand, in the case of the write command accompanied by an enciphering set command or, the write command which is not accompanied by a no-enciphering set command, enciphered data is recorded in an enciphered data region 502 on the magneto-optical disk 12 as shown in FIG. 7. The non-enciphered data region 501 and the enciphered data region 502 may coexist on the magneto-optical disk 12.

Figure 8:
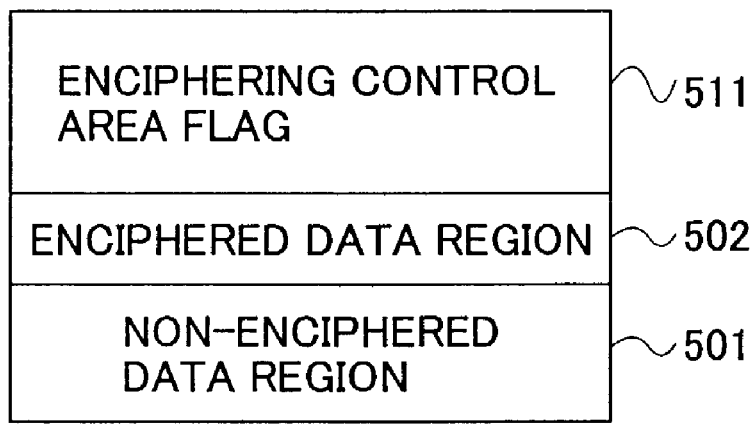
FIG. 8 is a diagram showing an enciphering control area and the data regions on the magneto-optical disk.

Next, a description will be given of the operation for a case where the judgement to determine whether the enciphering is to be made during the recording and whether the deciphering is to be made during the reproduction are based on the data reproduced from the magneto-optical disk 12. FIG. 8 is a diagram showing an enciphering control area 511 and the data regions 501 and 502 on the magneto-optical disk 12. In FIG. 8, those parts which are the same as those corresponding parts in FIG. 7 are designated by the same reference numerals, and a description thereof will be omitted. In this case, an enciphering flag with respect to each data region is stored in the enciphering control area 511. The enciphering flag is turned ON when enciphering and deciphering the data, and the enciphering flag is turned OFF when not enciphering and not deciphering the data. Accordingly, of the enciphering flags stored in the enciphering control area 511, the enciphering flag with respect to the enciphered data region 502 is turned ON, and the enciphering flag with respect to the non-enciphered data region 501 is turned OFF.

FIG. 9 is a flow chart for explaining a process of creating the magneto-optical disk 12 which stores the enciphering flags. In a step S31 shown in FIG. 9, a contents provider records the enciphered data of pay-contents, for example, in the enciphered data region 502 of the magneto-optical disk 12 shown in FIG. 8. In this case, the enciphering flag within the enciphering control area 511, corresponding to the enciphered data region 501, is turned OFF. In a step S32, the contents provider or contents vendor distributes the magneto-optical disk 12 recorded in the step S31 to the users. In a step S33, the user pays the fee for the pay-contents by a known transaction method such as credit card settlement. In a step S34, the user receives consent information from the contents provider by a know method such as electronic mail. When receiving the consent information by electronic mail, the host unit 102 used by the user is connected to the Internet via one or more cable and/or wireless networks by a known method. In a step S35, the user transfers the received consent information from the host unit 102 to the magneto-optical disk apparatus 100.

In a step S36, the MPU 6 of the magneto-optical disk apparatus 100 decides whether or not the consent information transferred from the host unit 102 is the correct consent information for the magneto-optical disk 12, by collating the consent information with the consent information recorded on the magneto-optical disk 12. If the user has not paid for the pay-contents, the user cannot receive the correct consent information from the contents provider in the step S34, and the decision result in the step S36 becomes NO. In this case, no operation is made with respect to the enciphering flag within the enciphering control area 511. For this reason, the enciphering flag with respect to the enciphered data region 502 remains turned OFF, and it is impossible to decipher the enciphered data recorded in the enciphered data region 502. Accordingly, the user who has the magneto-optical disk 12 in possession but has not paid for the pay-contents may be able to read the enciphered data recorded in the enciphered data region 502, however, this user cannot decipher the enciphered data recorded in the enciphered data region 502. In other words, the decision result in the step S15 shown in FIG. 3 always becomes NO in this case, and the deciphering of the enciphered data is impossible. Therefore, the user who has not paid for the pay-contents cannot illegally use the enciphered data recorded in the enciphered data region 502.

On the other hand, if the decision result in the step S35 is YES, in a step S37, the MPU 6 of the magneto-optical disk apparatus 100 turns ON the enciphering flag within the enciphering control area 511, which is OFF and correspond to the enciphered data region 502 on the magneto-optical disk 12. As a result, the decision result in the step S15 shown in FIG. 3 becomes YES, thereby making it possible to decipher the enciphered data within the enciphered data region 502. Therefore, the legitimate or authorized user who has paid for the pay-contents can decipher and use the enciphered data.

Next, a description will be given of judgements as to whether the enciphering or deciphering is necessary based on data read from a non-volatile memory within the magneto-optical disk apparatus 100, by referring to FIGS. 10A through 10D. In the following description, it is assumed for the sake of convenience that the non-volatile memory is provided within the memory 7, but it is of course possible for the non-volatile memory to be provided separately from the memory 7.

Figure 10A:
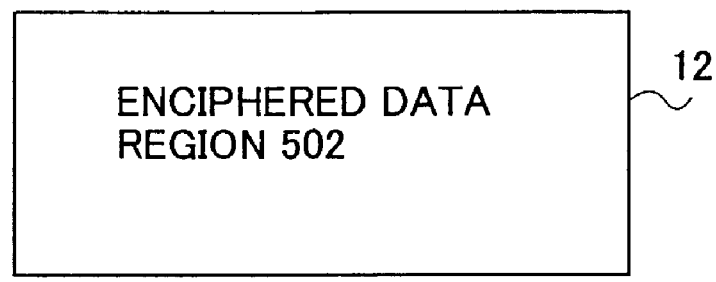
FIGS. 10A through 10D are diagrams for explaining judgements as to whether enciphering or deciphering is necessary based on data read from a non-volatile memory within a magneto-optical disk apparatus.
Figure 10B:
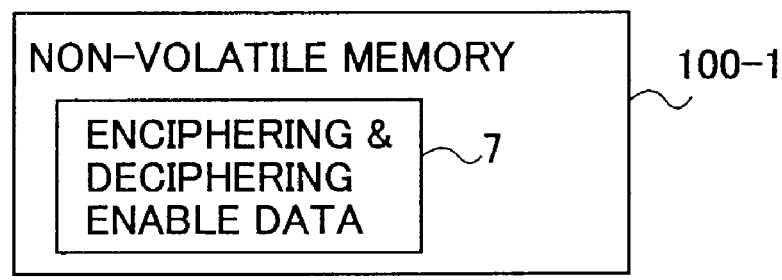
Figure 10C:
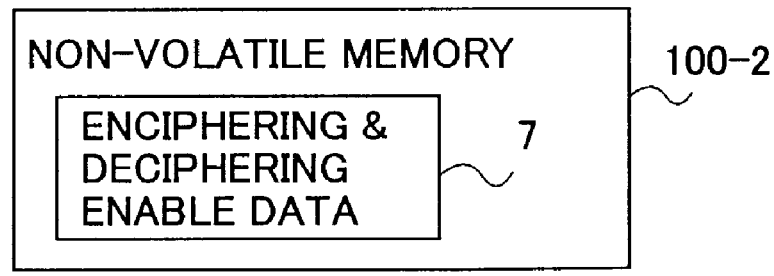
Figure 10D:
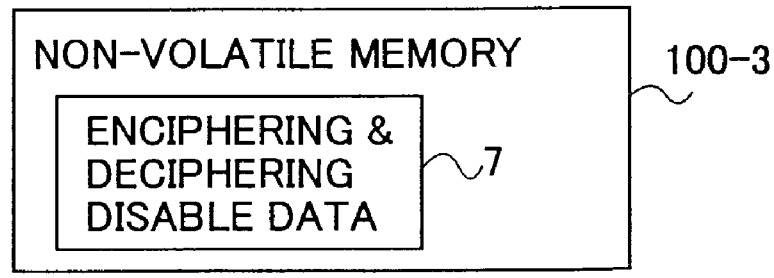

FIG. 10A shows the magneto-optical disk 12 which is recorded with the enciphered data in the enciphered data region 502. In addition, FIGS. 10B, 10C and 10D respectively show the data stored in the respective non-volatile memories of magneto-optical disk apparatuses 100-1, 100-2 and 100-3. Each non-volatile memory stores data indicating whether or not the enciphering and deciphering of data is to be enabled with respect to each magneto-optical disk 12 used. As shown in FIGS. 10B and 10C, the non-volatile memories of the magneto-optical disk apparatuses 100-1 and 100-2 store enciphering and deciphering enable data which enables the enciphering and deciphering of data with respect to the magneto-optical disk 12 shown in FIG. 10A. On the other hand, as shown in FIG. 10D, the nonvolatile memory of the magneto-optical disk apparatus 100-3 stores enciphering and deciphering disable data which disables the enciphering and deciphering of data with respect to the magneto-optical disk 12 shown in FIG. 10A. The enciphering and deciphering enable data and the enciphering and deciphering disable data may be prestored in the non-volatile memory of each magneto-optical disk apparatus 100 with respect to each magneto-optical disk 12.

If the user possesses the magneto-optical disk 12 shown in FIG. 10A, the user may be able to read the enciphered data recorded in the enciphered data region 502. However, when the user uses the magneto-optical disk apparatus 100-3 shown in FIG. 10D, the enciphering and deciphering disable data is read from the non-volatile memory, and the enciphered data read from the enciphered data region 502 cannot be deciphered. In other words, the decision result in the step S15 shown in FIG. 3 always becomes NO when the magneto-optical disk apparatus 100-3 is used, thereby making it impossible to decipher the enciphered data or illegally use the enciphered data.

On the other hand, when the user uses the magneto-optical disk apparatus 100-1 shown in FIG. 10B or the magneto-optical disk apparatus 100-2 shown in FIG. 10C, the enciphering and deciphering enable data is read from the non-volatile memory. Thus, the decision result in the step S15 shown in FIG. 3 becomes YES, and the enciphered data within the enciphered data region 502 can be deciphered. As a result, the legitimate or authorized user can decipher and use the enciphered data.

Similarly, when recording data on the magneto-optical disk 12 shown in FIG. 10A, the enciphering is possible on the magneto-optical disk apparatuses 100-1 and 100-2 shown in FIGS. 10B and 10C, but the enciphering is impossible on the magneto-optical disk apparatus 100-3 shown in FIG. 10D.

The enciphering and deciphering enable data and the enciphering and deciphering disable data may be prestored in the non-volatile memory with respect to each user who uses the same magneto-optical disk apparatus 100. In this case, it is possible to enable or disable the enciphering and deciphering of the data in units of users.

The key data held in the key data holding circuit 5 within the magneto-optical disk apparatus may be acquired from the host unit 102 or, reproduced from the magneto-optical disk 12 or, read from the non-volatile memory within the memory 7 or from the non-volatile memory provided separately from the memory 7 within the magneto-optical disk apparatus 100 under the control of the MPU 6.

First, a description will be given of a case where the key data held in the key data holding circuit 5 is acquired from the host unit 102. In this case, it is assumed that in the magneto-optical disk apparatus 100, a key data valid flag indicating whether the key data held within the key data holding circuit 5 is valid or invalid is stored within the memory 7. The host unit 102 first transmits the key data to the key data holding circuit 5, and holds the key data in the key data holding circuit 5 under the control of the MPU 6. Then, the host unit 102 turns ON the key data valid flag stored in the memory 7, in order to validate the key data held in the key data holding circuit 5. In the magneto-optical disk apparatus 100, the enciphering and deciphering of the data using the key data held in the key data holding circuit 5 is enabled and the enciphering and deciphering circuit 3 is enabled, if the key data valid flag is turned ON.

Figure 11:
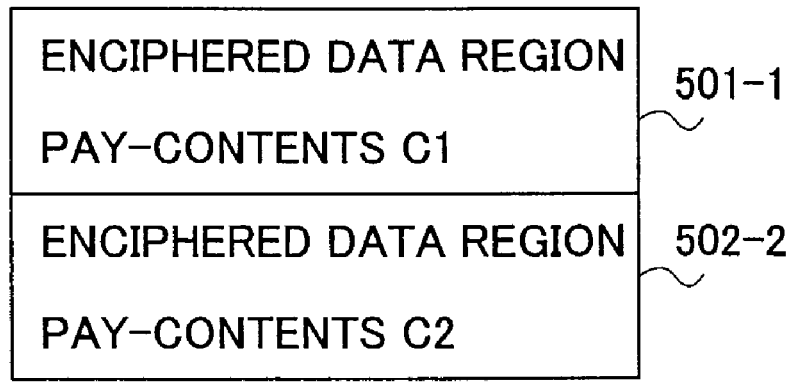
FIG. 11 is a diagram showing a magneto-optical disk recorded with data enciphered by a plurality of key data.

In this case, it is possible to create a magneto-optical disk 12 recorded with contents shown in FIG. 11. FIG. 11 is a diagram showing the magneto-optical disk 12 recorded with data enciphered by a plurality of key data. For example, in the magneto-optical disk 12 shown in FIG. 11, pay-contents C1 are enciphered using key data K1 and recorded in an enciphered data region 501-1, and pay-contents C2 are enciphered using key data K2 and recorded in an enciphered data region 501-2. In this case, the key data K1 and K2 are held in the key data holding circuit 5, but corresponding key data valid flags are both turned OFF. If the user pays for the pay-contents C1, for example, and the corresponding key data K1 and the information for validating the key data K1 by turning ON the corresponding key data valid flag are acquired from the provider via the Internet or the like, the acquired information is transferred to the magneto-optical disk apparatus 100. Thus, the acquired key data K1 is held in the key data holding circuit 5, and the corresponding key data valid flag within the memory 7 is turned ON. As a result, the user can decipher the enciphered pay-contents C1 using the validated key data K1.

Figure 12:
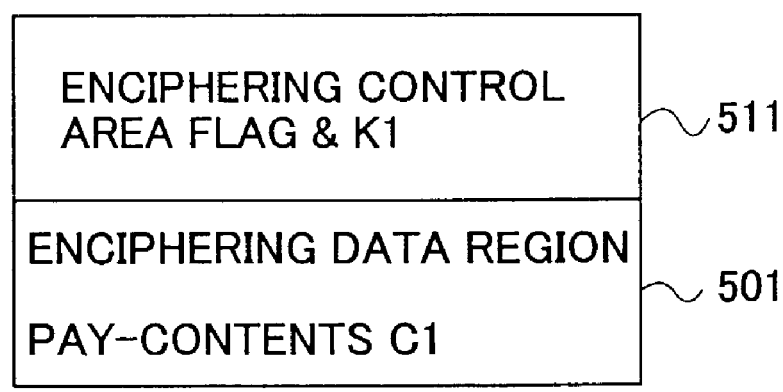
FIG. 12 is a diagram for explaining enciphering and deciphering based on key data reproduced from the magneto-optical disk.

Next, a description will be given of a case where the key data held in the key data holding circuit 5 is reproduced from the magneto-optical disk 12, by referring to FIG. 12. FIG. 12 is a diagram for explaining the enciphering and deciphering based on the key data reproduced from the magneto-optical disk 12. In this case, it is assumed that, in the magneto-optical disk apparatus 100, the key data valid flag which indicates whether the key data held within the key data holding circuit 5 is valid or invalid is turned OFF and stored in the memory 7. First, the host unit 102 reproduces the key data recorded in the enciphering control area 511 of the magneto-optical disk 12 shown in FIG. 12, and holds the reproduced key data in the key data holding circuit 5. Then, the host unit 102 turns ON the corresponding key data valid flag stored in the memory 7 in order to validate the key data held in the key data holding circuit 5 within the magneto-optical disk apparatus 100. In the magneto-optical disk apparatus 100, the enciphering and deciphering of the data using the key data held in the key data holding circuit 5 is enabled and the enciphering and deciphering circuit 3 is enabled, if the corresponding key data valid flag is turned ON.

In this case, it is possible to create the magneto-optical disk 12 which is recorded with the contents shown in FIG. 12. In the magneto-optical disk 12 shown in FIG. 12, for example, the pay-contents C1 is enciphered using the key data K1 and recorded in the enciphered data region 501. In addition, a flag similar to that described above in conjunction with FIG. 8 and the key data K1 are stored in the enciphering control area 511. In this case, the key data K1 is held in the key data holding circuit 5, but the corresponding key data valid flag is turned OFF. If the user pays for the pay-contents C1, for example, and the information for turning ON the corresponding key data valid flag is acquired from the provider via the Internet or the like, the acquired information is transferred to the magneto-optical disk apparatus 100. Thus, the key data valid flag within the memory 7, corresponding to the key data K1, is turned ON. As a result, the user can decipher the enciphered pay-contents C1 using the validated key data K1. By recording the key data on the magneto-optical disk 12 in this manner, it becomes unnecessary to transfer the key data from the host unit 102 to the magneto-optical disk apparatus 100. In addition, the key data can be changed for every magneto-optical disk 12. Therefore, it is possible to improve the security and copyright protection.

Next, a description will be given of a case where the key data held in the key data holding circuit 5 is read from the non-volatile memory such as the memory 7 within the magneto-optical disk apparatus 100, by referring to FIGS. 13A through 13D. FIGS. 13A through 13D are diagrams for explaining the enciphering and deciphering based on the key data reproduced from the non-volatile memory.

Figure 13A:
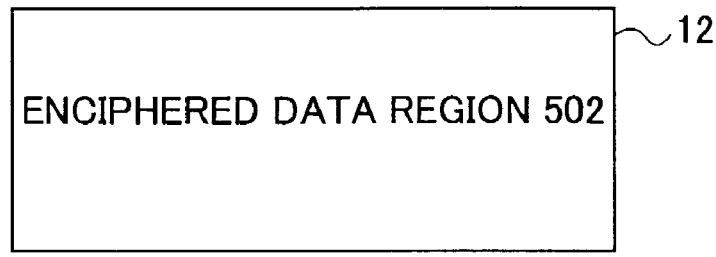
FIGS. 13A through 13D are diagrams for explaining enciphering and deciphering based on key data reproduced from a non-volatile memory.

FIG. 13A shows the magneto-optical disk 12 which requires the key data K1 in order to decipher the enciphered data recorded in the enciphered data region 502. In addition, FIGS. 13B, 13C and 13D respectively show the magneto-optical disk apparatuses 100-1, 100-2 and 100-3 which store in the respective key data holding circuits 5 the corresponding key data K1, K1 and K2 read from the respective non-volatile memories.

If the user possesses the magneto-optical disk 12 shown in FIG. 13A, the user may be able to read the enciphered data recorded in the enciphered data region 502. However, when the user uses the magneto-optical disk apparatus 100-3 shown in FIG. 13D, the key data K2 read from the non-volatile memory is different from the key data K1 for the magneto-optical disk 12 shown in FIG. 13A, and the enciphered data read from the enciphered data region 502 cannot be deciphered using the key data K2. In other words, the decision result in the step S15 shown in FIG. 3 always becomes NO when the magneto-optical disk apparatus 100-3 is used, thereby making it impossible to decipher the enciphered data or illegally use the enciphered data.

Figure 13B:
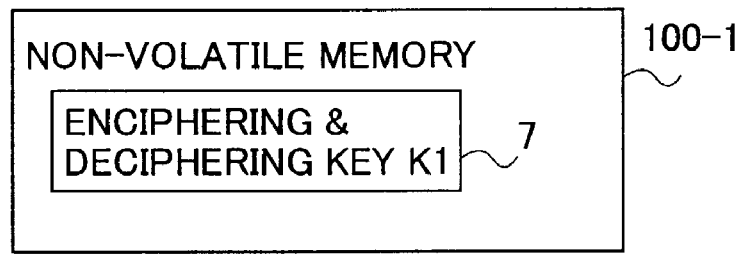
Figure 13C:
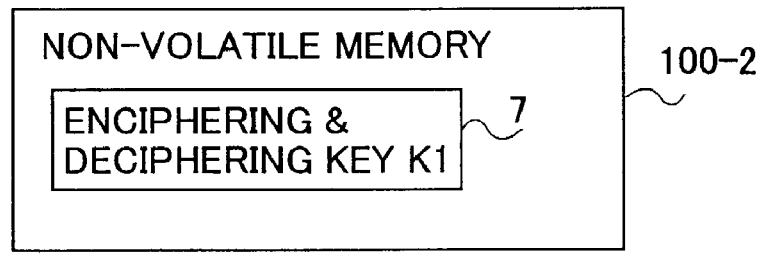

On the other hand, when the user uses the magneto-optical disk apparatus 100-1 shown in FIG. 13B or the magneto-optical disk apparatus 100-2 shown in FIG. 13C, the key data K1 is read from the non-volatile memory. Thus, the decision result in the step S15 shown in FIG. 3 becomes YES, and the enciphered data within the enciphered data region 502 can be deciphered using the key data K1. As a result, the legitimate or authorized user can decipher and use the enciphered data.

Figure 13D:
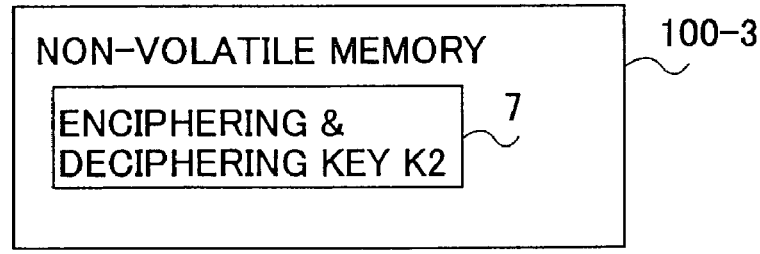

Similarly, when recording data on the magneto-optical disk 12 shown in FIG. 13A, the enciphering is possible on the magneto-optical disk apparatuses 100-1 and 100-2 shown in FIGS. 13B and 13C, but the enciphering is impossible on the magneto-optical disk apparatus 100-3 shown in FIG. 13D.

The key data may be prestored in the nonvolatile memory with respect to each magneto-optical disk apparatus 100 or, with respect to each user who uses the same magneto-optical disk apparatus 100. In the first case, it is possible to enable or disable the enciphering and deciphering of the data in units of magneto-optical disk apparatuses. On the other hand, in the second case, it is possible to enable or disable the enciphering and deciphering of the data in units of users.

Next, a description will be given of a case where the key data valid flag is automatically turned OFF at an arbitrary timing, so that the enciphered data recorded on the magneto-optical disk 12 is only usable for a predetermined time. The timing at which the key data valid flag is turned OFF may be triggered by a predetermined operation carried out by the host unit 102 or, triggered based on the time managed by an internal timer or the like of the MPU within the host unit 102 or within the magneto-optical disk apparatus 100. In the latter case, it is possible to automatically turn OFF the key data valid flag when the used time of the magneto-optical disk 12 counted by the internal timer or the like reaches a predetermined time or, when a predetermined time elapses from the last time the magneto-optical disk 12 is used. In addition, by using a plurality of kinds of key data valid flags, it is possible to set the predetermined time described above depending on the kind of key data valid flag.

Accordingly, even if the legitimate or authorized user leaves his seat in a state where the magneto-optical disk 12 is loaded into the magneto-optical disk apparatus 100, for example, it is possible to prevent illegal or unauthorized use of the magneto-optical disk 12 by a third party. Hence, this is effective in a case where pay-contents such as time-limited information is recorded on the magneto-optical disk 12 and provided to the user. In other words, by recording on the magneto-optical disk 12 the time-limited information which is only usable for a predetermined time, such as movie information, music information and game software information, it is possible to provide a kind of information rental service which does not require the magneto-optical disk 12 to be returned to the provider. In the case of the video rental system, for example, the user must return the rented video tape cassette, DVD or the like to the rental service provider. However, by maintaining the key data valid flag ON for only a predetermined time as described above, it becomes impossible to decipher the enciphered data recorded on the magneto-optical disk 12 after the predetermined time, thereby making it unnecessary for the user to return the magneto-optical disk 12 to the provider.

Figure 14:
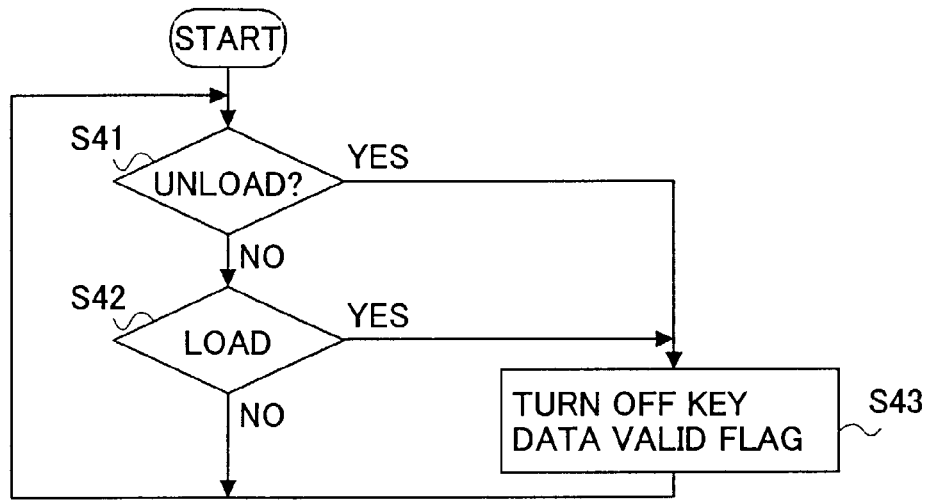
FIG. 14 is a flow chart for explaining the operation for a case where a key data valid flag is turned OFF when the magneto-optical disk is loaded or unloaded.

FIG. 14 is a flow chart for explaining the operation for a case where the key data valid flag is turned OFF when the magneto-optical disk 12 is loaded into or unloaded from the magneto-optical disk apparatus 100. In a step S41 shown in FIG. 14, the MPU 6 of the magneto-optical disk apparatus 100 decides whether or not the magneto-optical disk 12 is unloaded. If the decision result in the step S41 is NO, in a step S42, the MPU 6 decides whether or not the magneto-optical disk 12 is loaded. The process returns to the step S41 if the decision result in the step S42 is NO. On the other hand, if the decision result in the step S41 or S42 is YES, a step S43 turns OFF the key data valid flag stored in the non-volatile memory, and the process returns to the step S41.

The host unit 102 cannot be aware of all of the timings at which the key data valid flag is turned OFF. For this reason, if the host unit 102 is not aware of a certain timing at which the key data valid flag is turned OFF, the data which should be enciphered before recording may be recorded on the magneto-optical disk 12 without being enciphered or, the enciphered data reproduced from the magneto-optical disk 12 may be transferred to the host unit 102 without being deciphered. Accordingly, it is desirable to notify the host unit 102 from the magneto-optical disk apparatus 100 when the key data valid flag is turned OFF.

Figure 15:
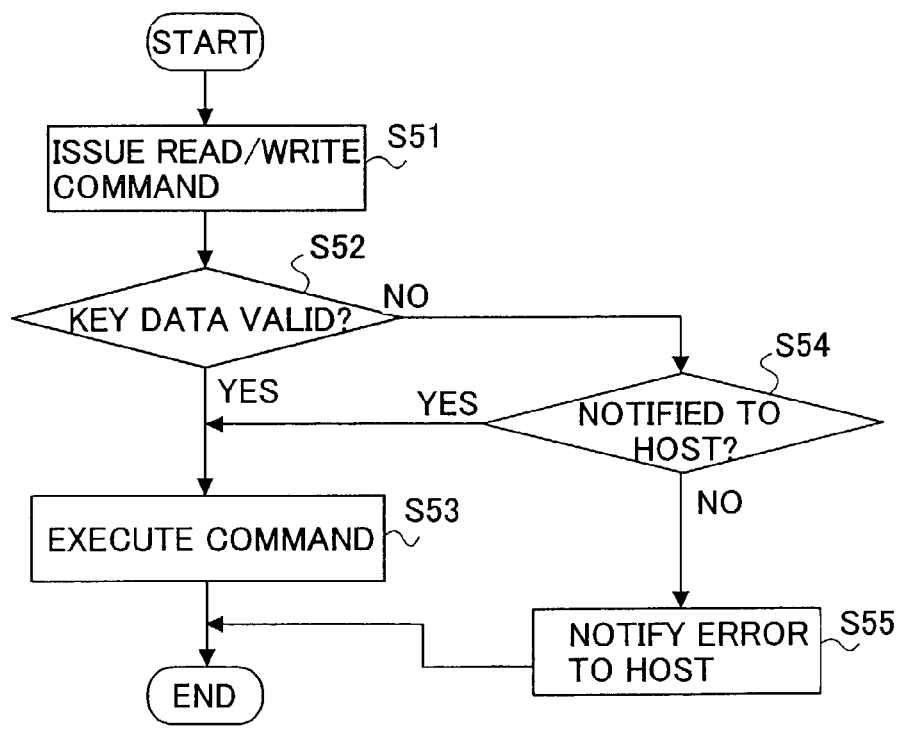
FIG. 15 is a flow chart for explaining the operation for a case where the host unit is notified when the key data valid flag is turned OFF.

FIG. 15 is a flow chart for explaining the operation for a case where the host unit 102 is notified from the magneto-optical disk apparatus 100 when the key data valid flag is turned OFF. In a step S51 shown in FIG. 15, the host unit 102 issues a read/write command with respect to the magneto-optical disk apparatus 100. In a step S52, the MPU 6 of the magneto-optical disk apparatus 100 decides whether or not the key data valid flag is turned ON. If the decision result in the step S52 is YES, in a step S53, the MPU 6 executes the read/write command from the host unit 102, and the process ends. In the case of the write command, the process starting from the step S2 shown in FIG. 2 is carried out. In the case of the read command, the process starting from the step S12 shown in FIG. 3 is carried out.

On the other hand, if the decision result in the step S52 is NO, in a step S54, the MPU 6 of the magneto-optical disk apparatus 100 decides whether or not the OFF state of the key data valid flag is already notified to the host unit 102. The process advances to the step S53 if the decision result in the step S54 is YES. If the decision result in the step S54 is NO, in a step S55, the MPU 6 makes an error notification with respect to the host unit 102 only once, and the process ends. Therefore, when viewed from the host unit 102, the host unit 102 receives a notification in the same manner as when the loaded magneto-optical disk 12 within the magneto-optical disk apparatus 100 is changed. In other words, when the key data valid flag is turned OFF, it is as if the loaded magneto-optical disk 12 is changed from that having the corresponding key data which is validated to that having the corresponding data which is invalidated, when viewed from the host unit 102.

Figure 16:
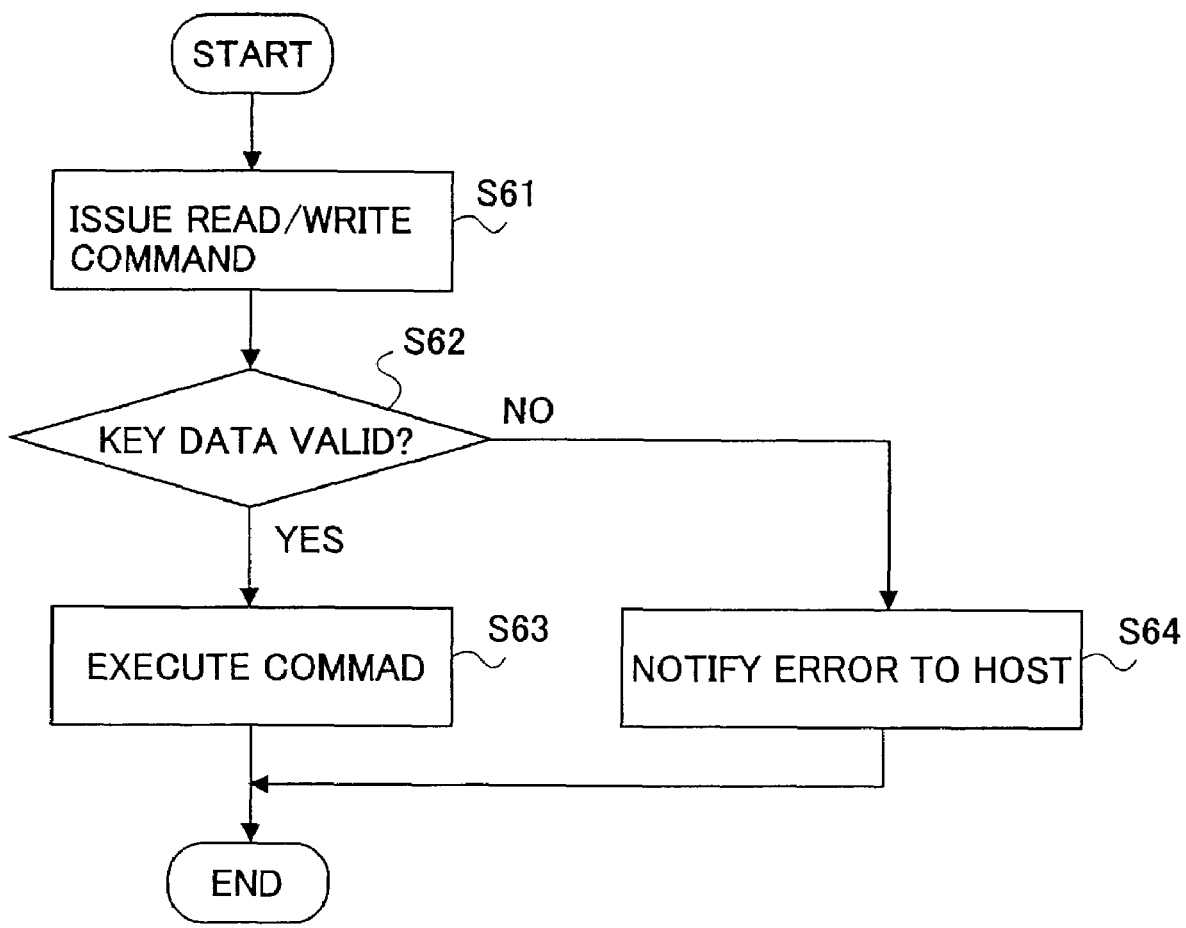
FIG. 16 is a flow chart for explaining an access prohibit process.

Next, a description will be given of an access prohibit process which prohibits access to the magneto-optical disk 12 when the key data valid flag is turned OFF, by referring to FIG. 16. FIG. 16 is a flow chart for explaining the access prohibit process.

Even when the key data valid flag is turned OFF, it is possible to record data on the magneto-optical disk 12 without enciphering and to transfer the enciphered data reproduced from the magneto-optical disk 12 to the host unit 102 without deciphering. If such operations are permitted and there already exists an deciphered data which is obtained by deciphering the enciphered data reproduced from the magneto-optical disk 12, it becomes possible to compare the already existing deciphered data and the enciphered data which is reproduced from the magneto-optical disk 12. From this comparison, it is not impossible to analyze the enciphering algorithm, and problems may occur from the security point of view. Accordingly, in the access prohibit process shown in FIG. 16, the magneto-optical disk apparatus 100 is prohibited from executing access commands such as the read/write command from the host unit 102, when the key data valid flag is turned OFF.

In a step S62 shown in FIG. 16, the host unit 102 issues a read/write command with respect to the magneto-optical disk apparatus 100. In a step S62, the MPU 6 of the magneto-optical disk apparatus 100 decides whether or not the key data valid flag is turned ON. If the decision result in the step S62 is YES, in a step S63, the MPU 6 executes the read/write command from the host unit 102, and the process ends. In the case of the write command, the process starting from the step S2 shown in FIG. 2 is carried out. In the case of the read command, the process starting from the step S12 shown in FIG. 3 is carried out.

On the other hand, if the decision result in the step S62 is NO, in a step S64, the MPU 6 of the magneto-optical disk apparatus 100 makes an error notification with respect to the host unit 102, and the process ends. Therefore, when the key data valid flag is turned OFF, the magneto-optical disk unit 100 is prohibited from executing the read/write command from the host unit 102.

Even when the key data valid flag is turned OFF, it is possible to record data on the magneto-optical disk 12 without enciphering and to transfer the enciphered data reproduced from the magneto-optical disk 12 to the host unit 102 without deciphering. If such operations are permitted, the data region of the magneto-optical disk 12 is first read in the case of existing personal computers or the like. However, since the enciphered data read from the data region is not deciphered correctly, the magneto-optical disk 12 will be judged as being an invalid magneto-optical disk with respect to an operating system (OS) of the personal computer. For this reason, a message requesting instructions as to whether or not to perform a logical formatting of the magneto-optical disk will be displayed on the personal computer. If the user erroneously instructs the logical formatting of the magneto-optical disk, the magneto-optical disk 12 will be logically formatted in a non-enciphered state. In order to prevent such an erroneous operation, it is possible to at least prohibit the execution of only the write command when the key data valid flag is turned OFF.

Figure 17:
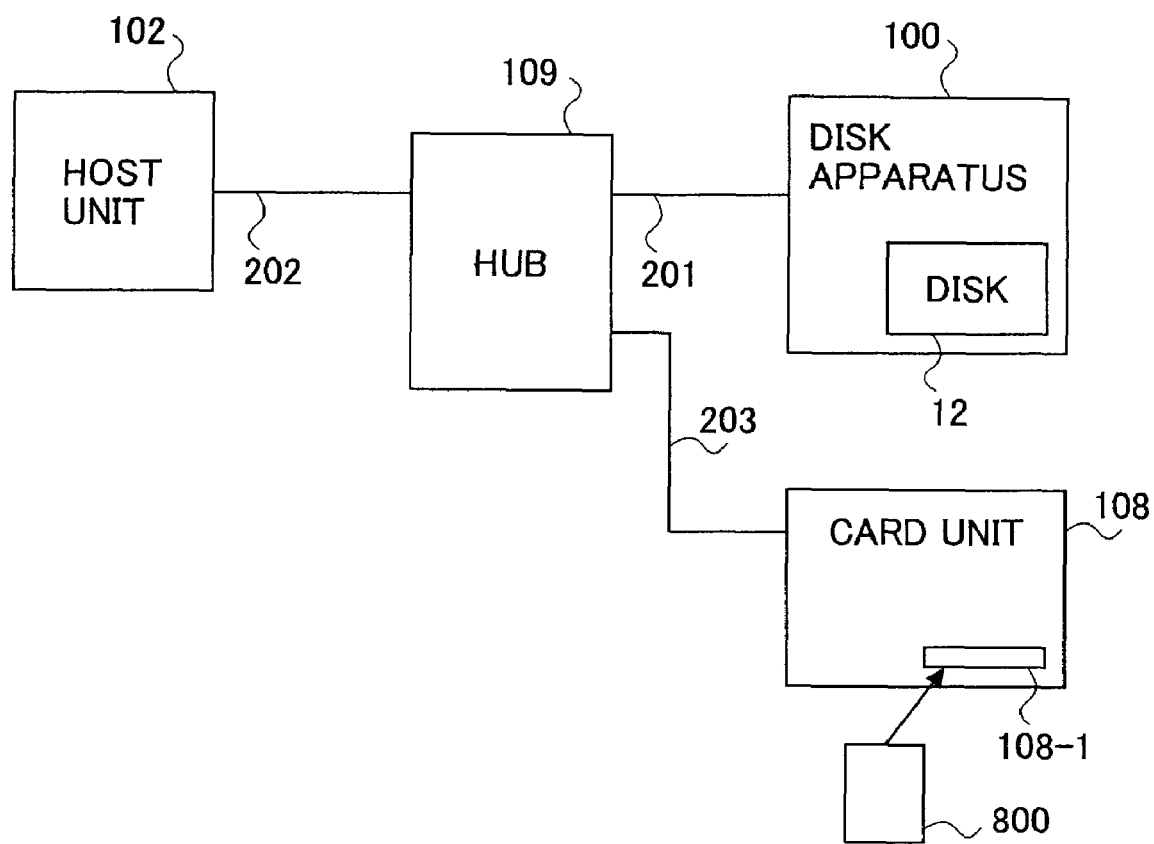
FIG. 17 is a diagram showing a second embodiment of the storage apparatus according to the present invention together with a host unit.

Next, a description will be given of a second embodiment of the storage apparatus according to the present invention. FIG. 17 is a diagram showing the second embodiment of the storage apparatus together with a host unit. In FIG. 17, those parts which are the same as those corresponding parts in FIG. 1 are designated by the same reference numerals, and a description thereof will be omitted. This second embodiment of the storage apparatus employs a second embodiment of the access control method according to the present invention.

In FIG. 17, the magneto-optical disk apparatus 100 is connected to the host unit 102 via an interface 201, a hub 109 and an interface 202. In addition, a card unit 108 is connected to the host unit 102 via an interface 203, the hub 109 and the interface 202. For example, the card unit 108 has a slot 108-1 into which a card 800 such as a memory card is inserted. This second embodiment of the storage apparatus may be formed by the magneto-optical disk apparatus 100 or, by a combination of the magneto-optical disk apparatus 10 and the card unit 108. The hub 109 may or may not be included in this second embodiment of the storage apparatus. Furthermore, the card unit 108 may be provided within the host unit 102, and in this case, the card unit 108 is connected to the MPU within the host unit 102 via the interface 203.

In this second embodiment, the key data is stored in the card 800 which is in the possession of the legitimate or authorized user. The card unit 108 is formed by a card reader having a known construction for reading the key data from the card 800. The key data is read from the card 800 by the card unit 108 and transferred to the magneto-optical disk apparatus 100 under the control of the host unit 102. Accordingly, a third party who does not have the card 800 in his possession cannot correctly reproduce the enciphered data recorded on the magneto-optical disk 12. The recording medium which stores the key data is of course not limited to the card 800, and may be any suitable recording media which are independent from the magneto-optical disk 12.

Figure 18:
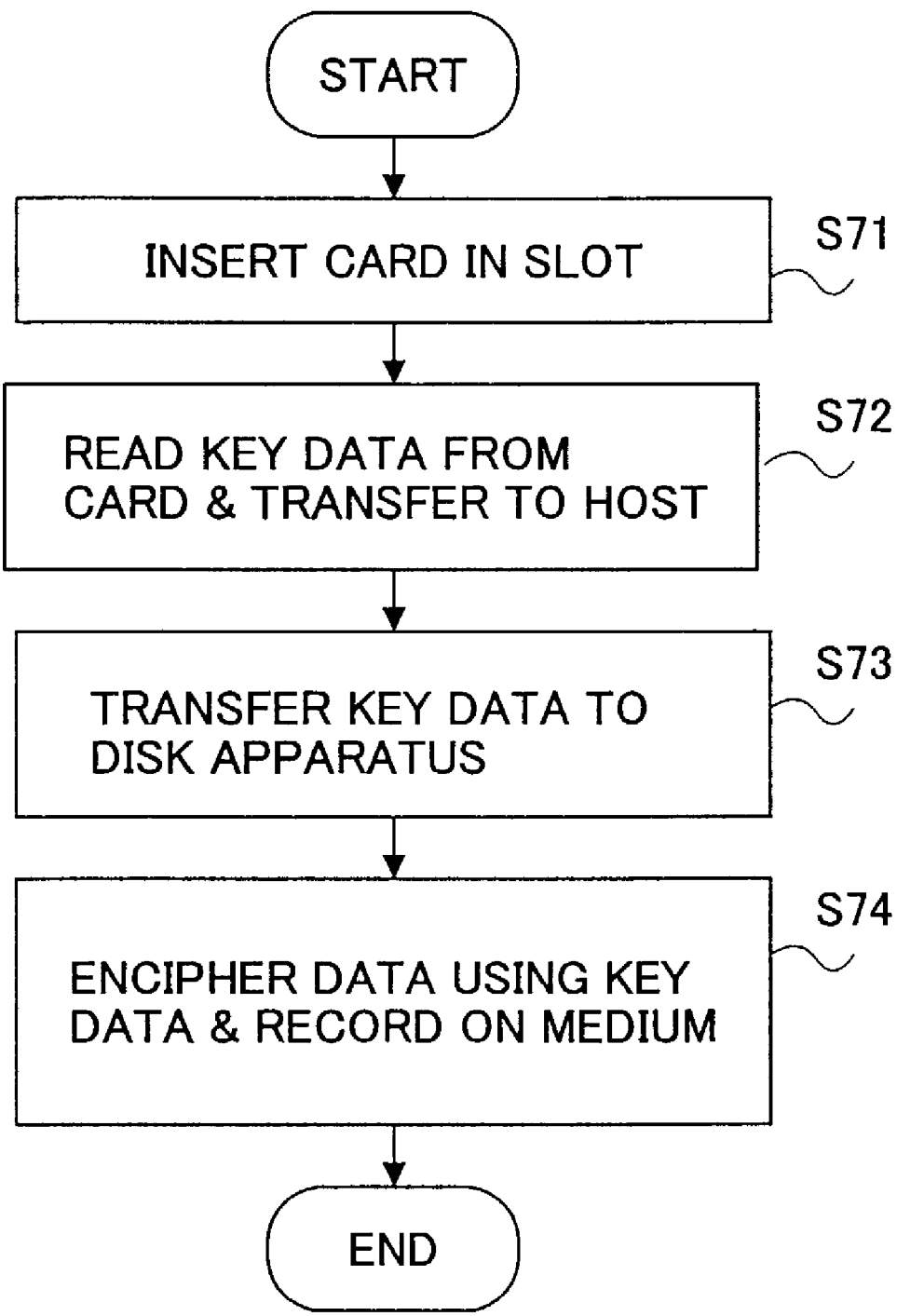
FIG. 18 is a flow chart for explaining the operation during recording.

FIG. 18 is a flow chart for explaining the operation during recording in this second embodiment. In a step S71 shown in FIG. 18, the user inserts the card 800 into the slot 108-1 of the card unit 108. In a step S72, the host unit 102 acquires the key data read from the card 800 by the card unit 108 via the hub 109. In a step S73, the host unit 102 transfers the acquired key data to the magneto-optical disk apparatus 100 via the hub 109. In a step S74, the MPU 6 of the magneto-optical disk apparatus 100 holds the key data in the key data holding circuit 5 in response to a write command from the host unit 102. In addition, the data is enciphered based on the key data and recorded on the magneto-optical disk 12, and the process ends.

Figure 19:
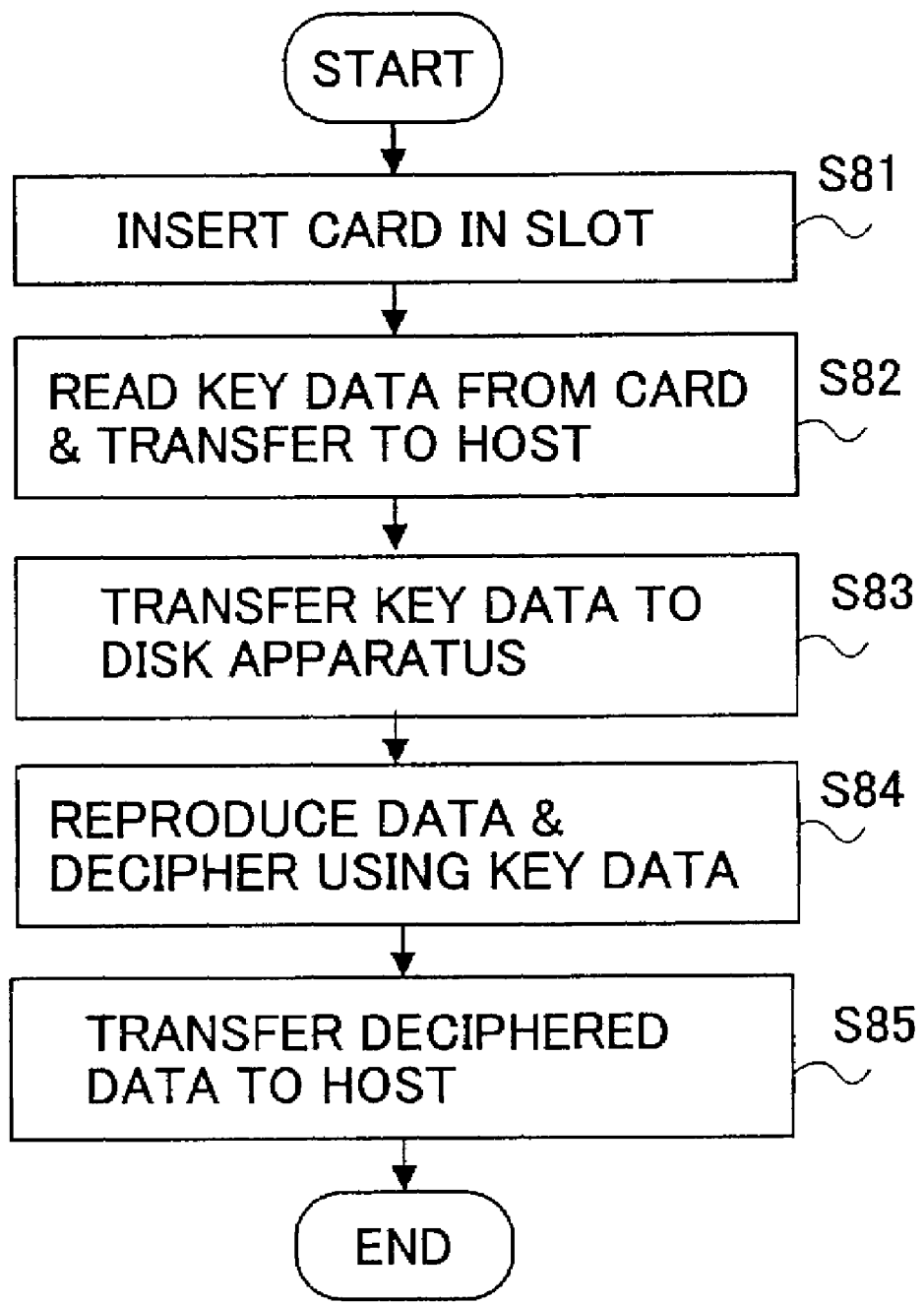
FIG. 19 is a flow chart for explaining the operation during reproduction.

FIG. 19 is a flow chart for explaining the operation during reproduction in this second embodiment. In a step S81 shown in FIG. 19, the user inserts the card 800 into the slot 108-1 of the card unit 108. In a step S82, the host unit 102 acquires the key data read from the card 800 by the card unit 108 via the hub 109. In a step S83, the host unit 102 transfers the acquired key data to the magneto-optical disk apparatus 100 via the hub 109. In a step S84, the MPU 6 of the magneto-optical disk apparatus 100 holds the key data in the key data holding circuit 5 in response to a read command from the host unit 102. In addition, the enciphered data reproduced from the magneto-optical disk 12 is deciphered using the key data. In a step S85, the MPU 6 transfers the deciphered data to the host unit 102 via the hub 109, and the process ends.

Figure 20:
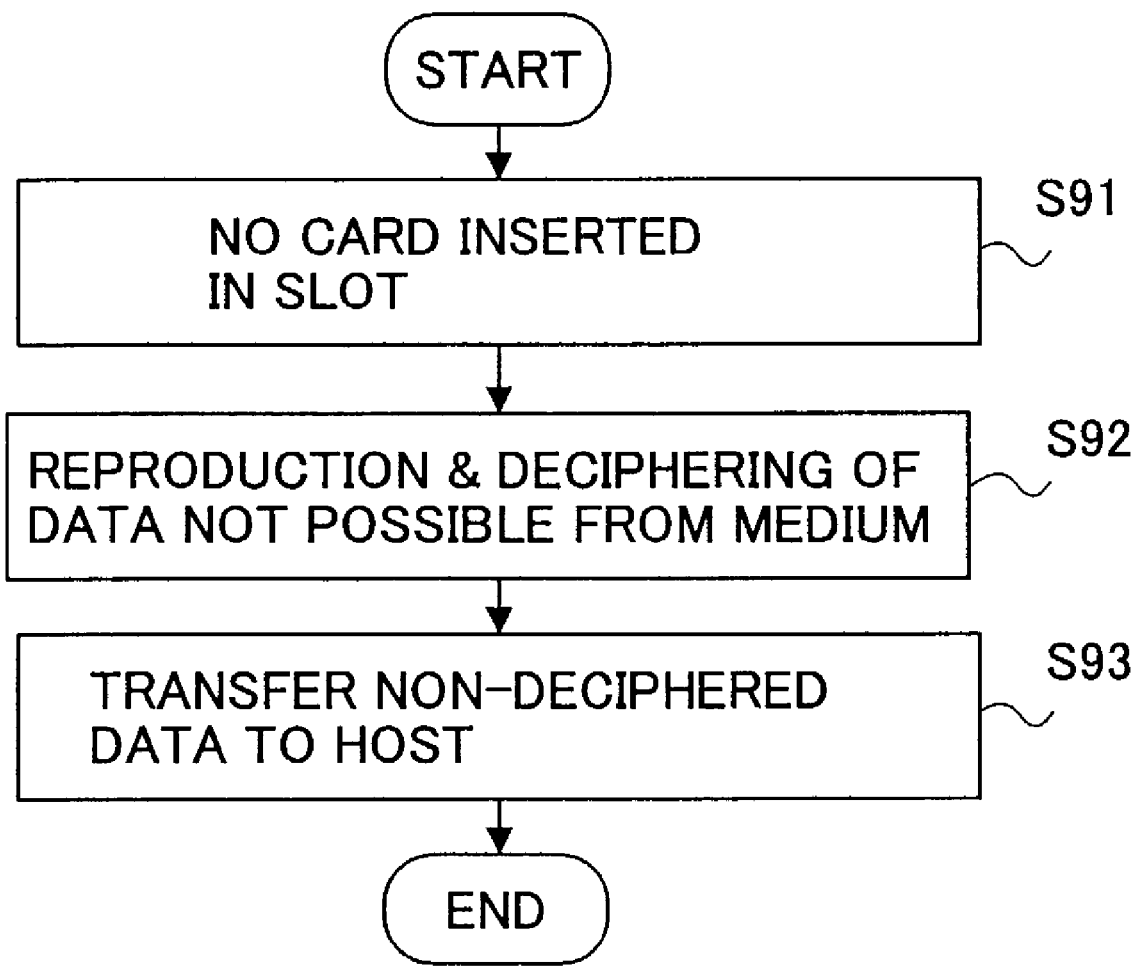
FIG. 20 is a flow chart for explaining the operation during reproduction.

FIG. 20 is a flow chart for explaining the operation during reproduction in this second embodiment. The process shown in FIG. 20 is carried out when the card 800 is not inserted into the slot 108-1 of the card unit 108. In a step S91 shown in FIG. 20, the host unit 102 recognizes that no card 800 is inserted into the slot 108-1 of the card unit 108. In a step S92, the MPU 6 of the magneto-optical disk apparatus 100 reproduces the enciphered data from the magneto-optical disk 12 in response to a read command from the host unit 102. In this case, the reproduced enciphered data is not deciphered because the key data cannot be acquired. In a step S93, the MPU 6 transfers the reproduced enciphered data to the host unit 102 via the hub 109, and the process ends. In this case, since the card 800 which indicates that the user is the legitimate or authorized user is not inserted into the card unit 108, it is impossible to correctly reproduce and transfer the data recorded on the magneto-optical disk 12 to the host unit 102.

In each of the embodiments described above, the storage medium used is a magneto-optical disk. However, the present invention is applicable to any suitable computer-readable storage media, including card-shaped and disk-shaped magnetic storage media, optical storage media and magneto-optical storage media, and semiconductor memory devices such as RAMs. In addition, the storage medium may be a fixed type which is fixed within the storage apparatus or, a portable type which is loaded into and unloaded from the storage apparatus.

Moreover, the storage apparatus, such as the magneto-optical disk apparatus, may be provided within the information processing apparatus.

The kinds of information recorded in and reproduced from such storage media, that is, the contents, are not limited to a specific kind, and for example, include document information, image information including movies and the like, audio information including music and the like, program information, software information including games and the like, personal information, various business information, or arbitrary combinations of such information. The contents are not limited to pay-contents, and the contents may be free-contents.

Further, the present invention is not limited to these embodiments, but various variations and modifications may be made without departing from the scope of the present invention.

What is claimed is:

1. An access control method for controlling access to a storage medium in a storage apparatus, comprising the steps of:
   obtaining a key data selected from a group consisting of a key data transferred from a host unit which is coupled to the storage apparatus, a key data reproduced from the storage medium, and a key data read from a recording medium other than the storage medium;
   obtaining, from a memory within the storage apparatus, key data valid information which indicates whether or not the obtained key data is valid; and
   deciphering without user interaction data reproduced from the storage medium using the key data only when the key data valid information is turned ON to indicate that the key data is valid; and
   turning OFF the key data valid information to indicate that the key data is invalid, at an arbitrary timing,
   wherein said arbitrary timing is one of a timing when a used time of the storage medium reaches a predetermined time and a timing when a predetermined time elapses from a last time the storage medium is used.

2. The access control method as claimed in claim 1, further comprising the step of:
   holding the key data in a holding circuit within the storage apparatus.

3. The access control method as claimed in claim 1, further comprising the step of:
   prohibiting at least one of a read access and a write access with respect to the storage medium when the key data valid information is turned OFF to indicate that the key data is invalid.

4. A control apparatus for controlling access to a storage medium in a storage apparatus, comprising:
   a key data holding circuit configured to obtain a key data selected from a group consisting of a key data transferred from a host unit which is coupled to the storage apparatus, a key data reproduced from the storage medium, and a key data read from a recording medium other than the storage medium;
   a microprocessor unit configured to obtain, from a memory within the storage apparatus, key data valid information which indicates whether or not the obtained key data is valid and further configured to turn OFF the key data valid information to indicate that the key data is invalid, at an arbitrary timing; and
   a deciphering circuit configured to decipher without user interaction data reproduced from the storage medium using the key data only when the key data valid information is turned ON to indicate that the key data is valid,
   wherein said arbitrary timing is one of a timing when a used time of the storage medium reaches a predetermined time and a timing when a predetermined time elapses from a last time the storage medium is used.

* * * * *